(No Model.)  
2 Sheets—Sheet 1.
E. HEUBACH.
Cattle Car.
No. 242,128. Patented May 31, 1881.
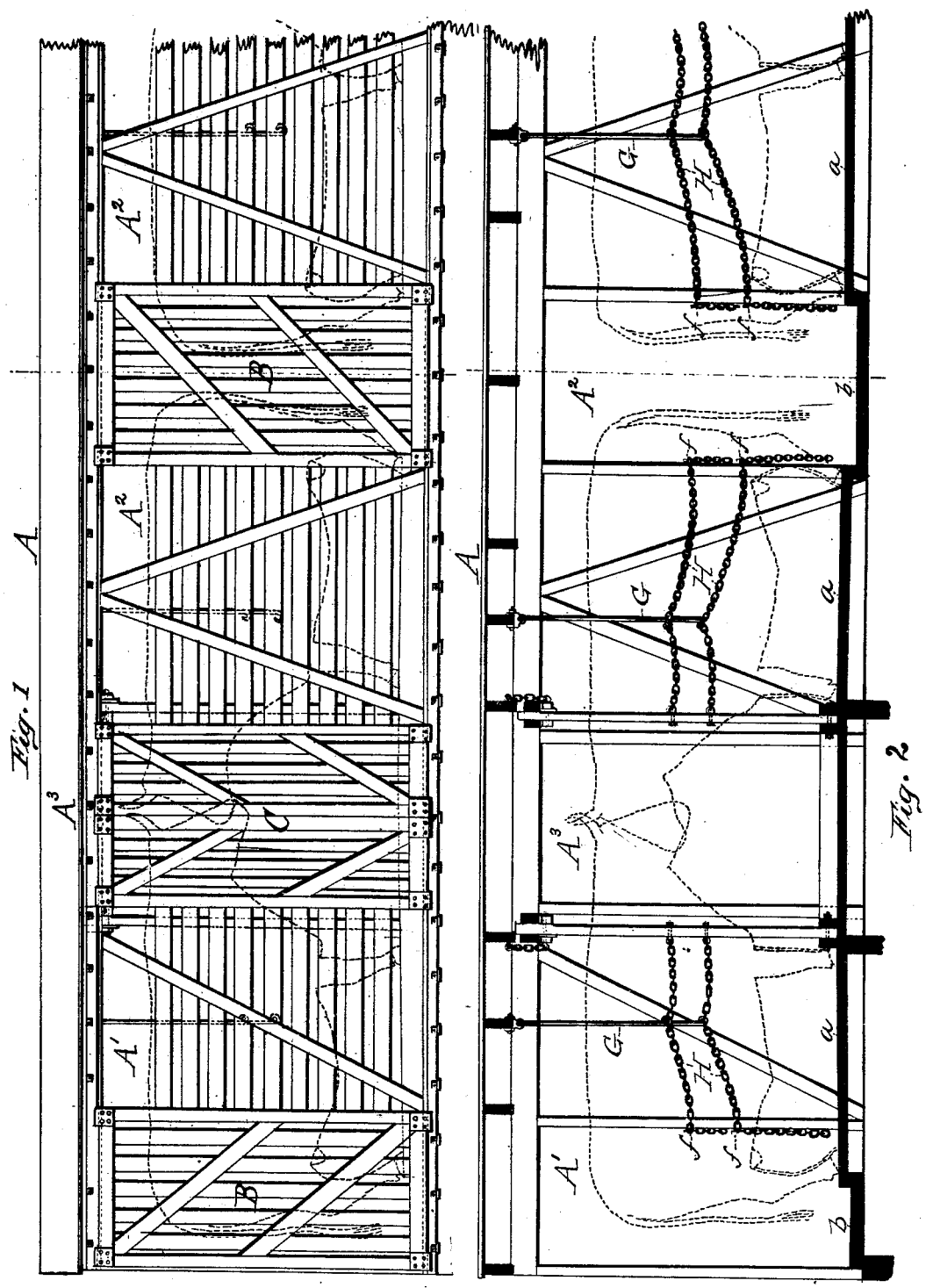
WITNESSES  
INVENTOR  
Emil Heubach  
By Lotz & Dyer  
Attorneys (No Model.)
E. HEUBACH.
Cattle Car.
No. 242,128.
2 Sheets—Sheet 2.
Patented May 31, 1881.
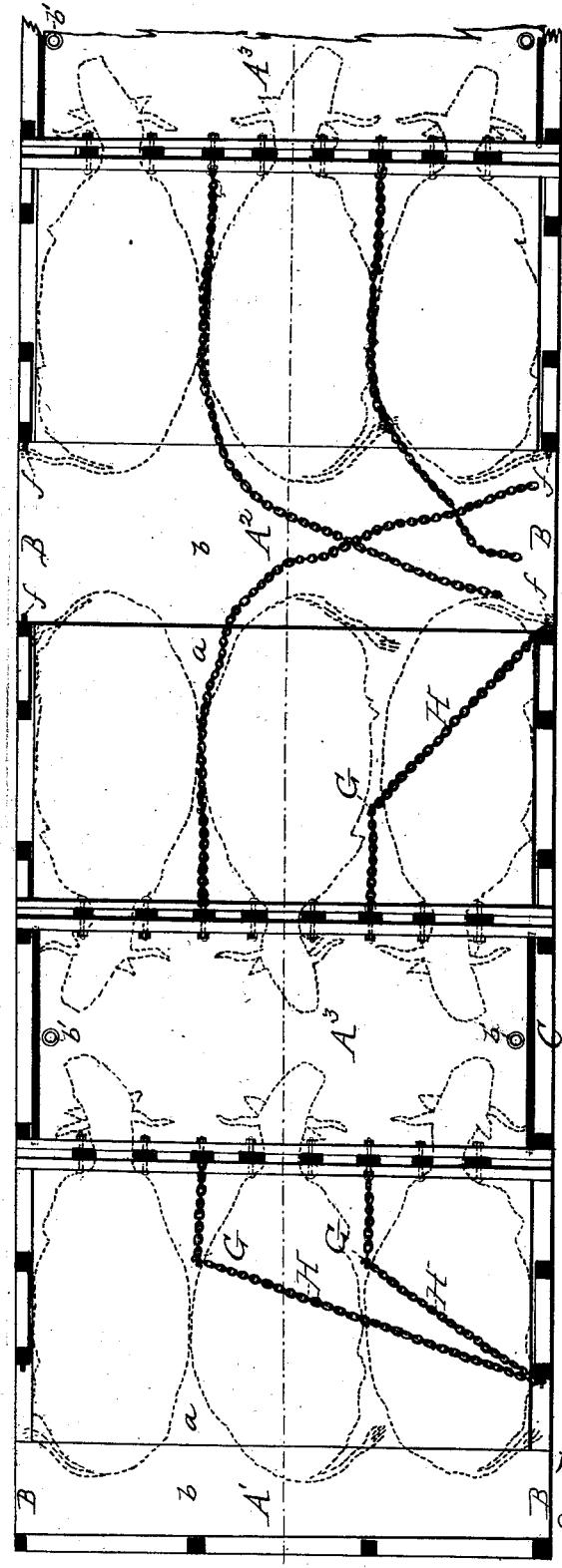
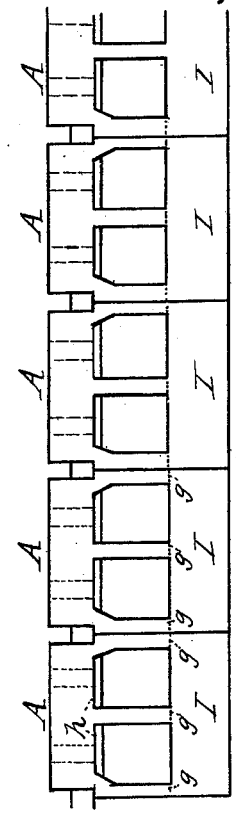
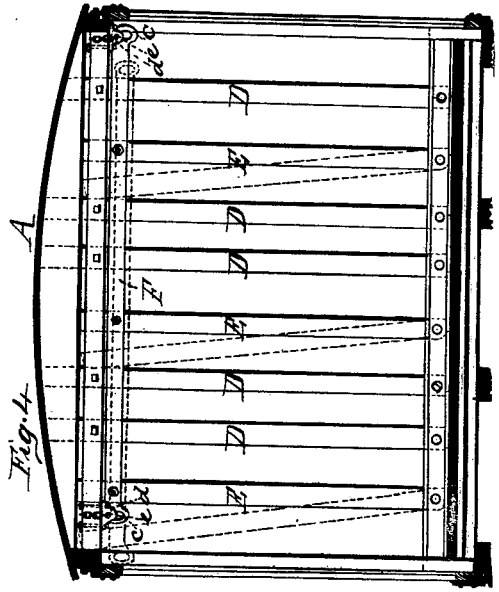
Witnesses
Inventor
Emil Heubach
By Latz & Dye,
Attorneys

UNITED STATES PATENT OFFICE.

EMIL HEUBACH, OF PARK RIDGE, ILLINOIS.

CATTLE-CAR.

SPECIFICATION forming part of Letters Patent No. 242,128, dated May 31, 1881.

Application filed December 27, 1880. (No model.)

*To all whom it may concern:*

Be it known that I, EMIL HEUBACH, of Park Ridge, in the county of Cook and State of Illinois, have invented a certain new and useful Improvement in Cattle-Cars, of which the following is a specification.

The object I have in view is to produce a car for transporting cattle in which the animals can be kept in a healthy condition, and will be allowed room to lie down, and at the same time all available space will be utilized, and which will further have convenient means for feeding and watering the animals, simple devices for securing them quickly in position, so that they cannot move about or interfere with each other, and a contrivance for forcing the animals to arrange themselves correctly in the car when the same is being loaded, all of which can be accomplished from the outside of the car, at the side thereof, without the necessity of entering the car.

It is also my intention that the improved car will be so constructed that it can be loaded in about the same time it now takes to load the ordinary car, and there will be no chance to jam the animals in the gateways of the chutes, as at present.

My invention consists in the peculiar novel arrangement and construction of my cattle-car, as fully hereinafter explained and pointed out by the claims.

In the accompanying drawings, forming a part hereof, Figure 1 is a side elevation of a portion of the car-body; Fig. 2, a vertical longitudinal section; Fig. 3, a horizontal section; Fig. 4, a vertical cross-section; and Fig. 5, a plan, showing the arrangement of the loading-chutes and their gateways.

Like letters denote corresponding parts in all the figures.

A represents the body of the car, which is divided by lateral partitions into five compartments—a cattle-pen, $A'$, at each end of the car for three animals, one, $A^2$, at the center for six animals, and two intermediate feed and water spaces, $A^3$.

The car is provided on each side with three sliding doors, B, for the cattle-pens $A'$ $A'$ $A^2$, and thus gives a separate entrance for each pen.

Each feed and water compartment $A^3$ is open at the ends, and provided with double sliding doors C, which give ready access to these spaces from the outside of the car.

The floor $a$ of the car, upon which the cattle stand, is preferably raised slightly above the sections $b$, connecting the opposite doors, B.

The bottoms of the spaces $A^3$ are formed to hold water or feed, and will have outlet-pipes $b'$ at each end, closed by stoppers, for drawing off the water.

The partitions which divide the cattle-pens from the compartments $A^3$ are composed of vertical bars D E. The bars D are stationary, while three of the bars of each partition (indicated by letter E) are pivoted at their lower ends. At their upper ends these pivoted bars are connected by a horizontal bar, F, extending nearly across the car, and having a handle, $c$, at each end. These handles are adapted to be grasped from the outside of the car. When the pivoted bars are in an upright position the handles $c$ will be located between downwardly-hanging lugs $d$, and they can be locked to such lugs by pins $e$ suspended from chains. These pivoted bars form the means for securing the animals, which push their heads between the pivoted and stationary bars when such pivoted bars are in inclined position, and are secured by the raising and locking of the pivoted bars.

The spaces intended for the animals are separated by vertical rods G hanging down from the roof of the car, and by horizontal chains H, which connect the lower ends of such rods with stationary bars D directly in front of them. The loose ends of the chains are long enough to allow them to be caught over hooks $f$ secured to the door-frames.

Now, in loading the car the two chains which divide the spaces for each lot of three cattle are caught on the hooks $f$, as shown at the left-hand compartment $A'$ in Fig. 3. The horizontal bars F are also unlocked, and the pivoted bars E are pushed into an inclined position. The first animal that enters each end compartment, $A'$, and the first two that enter the central pen, $A^2$, will be forced by the chains to take positions on the farther side of the car in the only spaces not closed by the chains. One of the chains H will then be dropped from each hook, and the central spaces will be opened and will be filled by the next four animals. The second chain of each pair will then be dropped, and the last four animals will take their proper positions, when they will all be secured by raising the pivoted bars E and locking them. The space alloted for each animal will be sufficient to allow it to lie down. The animals being secured, they cannot injure each other, and being arranged with their heads all in the clean and open feed and water compartments, they will be kept in a healthy condition.

In Fig. 5 is shown the arrangement for loading and unloading the cars. Each chute I is provided with three gateways, $g$, to correspond with the doors B of the car, and these gateways are made narrow, so that only one animal can pass through each at a time, and thus all danger of jamming a number of animals together in the gateways, as at present, will be avoided. A narrow walk, $h$, connects the gateways, upon which the attendants will stand to direct the animals into their positions in the car and to manipulate the chains and bars. The advantages of this arrangement will be readily appreciated by those acquainted with the barbarous manner in which cattle are at present handled.

This car can be used for carrying goods and merchandise generally, and will be exceedingly convenient for that purpose. The rods G and chains H will be first removed, when all the compartments $A'$, $A^2$, and $A^3$ can be filled through their doors B and C.

What I claim as my invention is—

1. A cattle-car having the single end pens, $A' A'$, and the double central pen, $A^2$, in combination with the intermediate spaces, $A^3$, divided from the end and central pens by lateral partitions, through which the heads of the animals project into such intermediate spaces, and the separate doors B C at the sides of the car for such cattle-pens and intermediate spaces, the bottom of each intermediate space, $A^3$, forming a single low feed and water trough extending laterally across the car, substantially as and for the purposes set forth.

2. A cattle-car having the single end pens, $A' A'$, the double central pen, $A^2$, and the intermediate spaces, $A^3$, having their bottoms constructed to form single long feed and water troughs, and receiving the heads of all the animals, in combination with mechanism for securing the animals, operated from the outside of the car, substantially as described and shown.

3. The cattle-car having end and central cattle-pens, $A' A' A^2$, and intermediate feed and water spaces, $A^3$, in combination with the lateral partitions provided with pivoted securing-bars E, and the operating-bars F, extending to the sides of the car, whereby the securing-bars can be operated from the outside of the car, substantially as described and shown.

4. A cattle-car having the compartments $A' A^2 A^3$, in combination with the rods G, chains H, provided with loose ends, and the hooks $f$, substantially as and for the purpose set forth.

EMIL HEUBACH.

Witnesses:
F. W. KASEHAGEN,
OTTO LEE JOHNSON.